(12) United States Patent
Shimizu et al.

(10) Patent No.: US 9,045,662 B2
(45) Date of Patent: Jun. 2, 2015

(54) NON-AQUEOUS PIGMENT INK AND PIGMENT DISPERSANT FOR NON-AQUEOUS PIGMENT INK

(71) Applicant: RISO KAGAKU CORPORATION, Tokyo (JP)

(72) Inventors: Manami Shimizu, Ibaraki-ken (JP); Kyoko Motoyama, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 42 days.

(21) Appl. No.: 13/648,509

(22) Filed: Oct. 10, 2012

(65) Prior Publication Data
US 2013/0102704 A1    Apr. 25, 2013

(30) Foreign Application Priority Data

Oct. 20, 2011    (JP) ................................. 2011-230527

(51) Int. Cl.
| | | |
|---|---|---|
| C09D 11/00 | (2014.01) | |
| C08L 31/00 | (2006.01) | |
| C08L 33/06 | (2006.01) | |
| C04B 35/634 | (2006.01) | |
| C08F 8/30 | (2006.01) | |
| C09D 11/326 | (2014.01) | |
| C09D 11/36 | (2014.01) | |

(52) U.S. Cl.
CPC .............. C09D 11/326 (2013.01); C09D 11/36 (2013.01)

(58) Field of Classification Search
CPC ............................. C09D 11/36; C09D 11/326
USPC ................... 523/160; 524/555, 556, 560, 561
See application file for complete search history.

(56) References Cited

U.S. PATENT DOCUMENTS

| | | | |
|---|---|---|---|
| 2003/0171485 A1* | 9/2003 | Catridge et al. | 524/555 |
| 2010/0021635 A1 | 1/2010 | Ookawa et al. | |
| 2011/0045257 A1* | 2/2011 | Arai et al. | 428/207 |

FOREIGN PATENT DOCUMENTS

| | | |
|---|---|---|
| CN | 1639216 | 7/2005 |
| JP | 2001-031885 | 2/2001 |
| JP | 2009-244740 | 10/2009 |
| JP | 2009-256290 | 11/2009 |
| JP | 2010-001452 | 1/2010 |
| WO | 03/046029 | 6/2003 |

OTHER PUBLICATIONS

Office Action issued Feb. 8, 2014 in the counterpart Chinese patent application (8 pages total).
Chunlong, "Physico-chemical Characters of Organic Pigment and Its Development Trend," Dyestuff Industry 37, No. 4, Apr. 2000, pp. 1-6 (English language abstract provided).

* cited by examiner

*Primary Examiner* — Alexander Kollias
(74) *Attorney, Agent, or Firm* — Hamre, Schumann, Mueller & Larson, P.C.

(57) ABSTRACT

A non-aqueous pigment ink is provided, wherein the non-aqueous pigment ink comprises an alkyl (meth)acrylate copolymer containing an alkyl (meth)acrylate unit having an alkyl group of 12 or more carbon atoms and a (meth)acrylate unit having a pyridyl group, a pigment, and a non-aqueous solvent.

15 Claims, No Drawings

NON-AQUEOUS PIGMENT INK AND PIGMENT DISPERSANT FOR NON-AQUEOUS PIGMENT INK

CROSS REFERENCE TO RELATED APPLICATIONS

This Application is based upon and claims the benefit of priority from prior Japanese Patent Applications No. 2011-230527 filed on Oct. 20, 2011, the entire contents of which are incorporated by reference herein.

BACKGROUND OF THE INVENTION

1. Field of the Invention

The present invention relates to a non-aqueous pigment ink and a pigment dispersant for a non-aqueous pigment ink.

2. Description of the Related Art

The coloring materials for inks used in inkjet recording systems can be broadly classified into materials that use pigments and materials that use dyes, and there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. Non-aqueous inks that do not use water as the ink solvent, including solvent-based inks that use a volatile solvent as the main constituent and oil-based inks that use a non-volatile solvent as the main constituent, exhibit superior drying properties to aqueous inks, and also exhibit excellent printability.

In non-aqueous inks, a pigment dispersant that dissolves in the solvent is generally used, but because this pigment dispersant enhanced the affinity between the solvent and the pigment, when the solvent penetrates into the recording medium such as a paper, the pigment tends to be also drawn into the interior of the recording medium. As a result, the print density tends to decrease, and show-through becomes more prevalent.

One pigment dispersant that has been proposed is formed from non-aqueous resin dispersion microparticles composed of an acrylic polymer containing an alkyl (meth)acrylate unit having an alkyl group of 12 or more carbon atoms and a (meth)acrylate unit having a urethane group (see Patent Document 1). Low-viscosity inks are more suitable as inkjet inks, but when the polymer containing urethane groups from Patent Document 1 is added to an ink, the viscosity of the ink tends to increase. Accordingly, further improvements are required in terms of obtaining good pigment dispersibility without requiring the introduction of urethane groups.

[Patent Document 1] JP 2010-1452 A

An object of the present invention is to provide a non-aqueous pigment ink and a pigment dispersant for a non-aqueous pigment ink that yield high image density, reduced show-through and favorable storage stability.

SUMMARY OF THE INVENTION

A first aspect of the present invention provides a non-aqueous pigment ink comprising: an alkyl (meth)acrylate copolymer containing an alkyl (meth)acrylate unit having an alkyl group of 12 or more carbon atoms and a (meth)acrylate unit having a pyridyl group, a pigment, and a non-aqueous solvent.

Another aspect of the present invention provides a pigment dispersant for a non-aqueous pigment ink, the pigment dispersant comprising an alkyl (meth)acrylate copolymer containing an alkyl (meth)acrylate unit having an alkyl group of 12 or more carbon atoms and a (meth)acrylate unit having a pyridyl group.

DETAILED DESCRIPTION OF THE EMBODIMENTS

A non-aqueous pigment ink according to one embodiment of the present invention (hereafter also referred to as simply "the ink") comprises an alkyl (meth)acrylate copolymer containing an alkyl (meth)acrylate unit having an alkyl group of 12 or more carbon atoms and a (meth)acrylate unit having a pyridyl group, a pigment, and a non-aqueous solvent. Here, the term "(meth)acrylate" means acrylate and/or methacrylate. Thereby, a non-aqueous pigment ink can be provided that exhibits high image density, reduced show-through and favorable storage stability.

In the ink of this embodiment, because the alkyl (meth)acrylate copolymer comprises a (meth)acrylate unit having a pyridyl group, the pyridyl group functions as a group that adsorbs to the pigment, thereby improving the adsorption between the alkyl (meth)acrylate copolymer and the pigment, and enabling the pigment to be dispersed stably within the ink.

Further, by including the (meth)acrylate unit having a pyridyl group in the alkyl (meth)acrylate copolymer, the fluidity of the ink can be improved, and the viscosity of the ink can be reduced.

The ink according to this embodiment comprises an alkyl (meth)acrylate copolymer containing an alkyl (meth)acrylate unit having an alkyl group of 12 or more carbon atoms and a (meth)acrylate unit having a pyridyl group.

By including the alkyl (meth)acrylate unit having an alkyl group of 12 or more carbon atoms, the alkyl (meth)acrylate copolymer exhibits excellent affinity with non-aqueous solvents. The number of carbon atoms within the alkyl group is preferably within a range from 12 to 25. Examples of the alkyl group of 12 or more carbon atoms include a dodecyl group, tridecyl group, tetradecyl group, pentadecyl group, hexadecyl group, heptadecyl group, octadecyl group, nonadecyl group, eicosanyl group, heneicosanyl group, docosanyl group, isododecyl group and isooctadecyl group, and these groups may include branching. Further, the copolymer may include a plurality of these alkyl groups.

It is thought that by including the (meth)acrylate unit having a pyridyl group, the Alkyl (meth)acrylate copolymer exhibits a superior adsorption action relative to the pigment, thereby enabling the pigment to be dispersed stably within the ink, improving the image density, reducing show-through, and enabling favorable storage stability to be achieved.

The (meth)acrylate unit having a pyridyl group may have the pyridyl group bonded at an arbitrary position within the (meth)acrylate unit. The bonding position of the pyridyl group may be position 2, position 3 or position 4.

The pyridyl group is preferably bonded to the (meth)acrylate unit as a portion of an amino group. In this case, an acid-base interaction further improves the adsorption to the pigment. Specifically, the pyridyl group can be introduced using a primary or secondary aminopyridine compound represented by general formula (1) shown below.

[Chemical Formula 1]

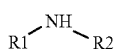

General formula (1)

In general formula (1), at least one of R1 and R2 independently represents -Py or —R3-Py. Here, -Py represents a position 2, position 3 or position 4 pyridyl group. R3 represents an arbitrary divalent group, and may be a substituted or unsubstituted, linear, branched or cyclic hydrocarbon group. When only one of R1 and R2 contains a pyridyl group, the remaining group represents an arbitrary monovalent group, which may be a substituted or unsubstituted, linear, branched or cyclic hydrocarbon group, and examples of groups that can be used favorably include a hydrogen atom, benzyl group, methyl group, cyclohexyl group and isopropyl group.

Although there are no particular limitations on the molecular weight (the mass average molecular weight measured by GPC) of the alkyl (meth)acrylate copolymer, in those cases where the copolymer is used within an inkjet ink, from the viewpoint of the discharge properties of the ink, the molecular weight is preferably within a range from approximately 10,000 to 100,000, and more preferably from approximately 10,000 to 80,000. A molecular weight within a range from 12,000 to 18,000 is particularly desirable.

The glass transition temperature (Tg) of the alkyl (meth) acrylate copolymer is preferably not higher than room temperature (25° C.), and is more preferably 0° C. or lower. This enables film formation to be promoted at room temperature when the ink is fixed to the recording medium.

From the viewpoint of ensuring the introduction of a suitable amount of pyridyl groups into the copolymer, the aminopyridine compound is preferably reacted in an amount that is sufficient to provide 0.25 to 1.00 molar equivalents, and more preferably 0.25 to 0.75 molar equivalents, of the pyridyl group within the aminopyridine compound relative to the functional group that is capable of reacting with an amino group in the reactive (meth)acrylate having a functional group that is capable of reacting with an amino group. When this amount of the pyridyl group within the aminopyridine compound is less than 1 molar equivalent, unreacted functional groups from the reactive (meth)acrylate remain in the copolymer, but it is thought that these residual functional groups function as pigment adsorption groups.

The amount of pyridyl groups within the alkyl (meth) acrylate copolymer per 1 g of the pigment is preferably within a range from 0.1 mmol to 0.6 mmol, and is more preferably from 0.15 mmol to 0.45 mmol.

From the viewpoint of ensuring favorable pigment dispersibility, the amount of the Alkyl (meth)acrylate copolymer within the ink composition is preferably at least 0.1% by mass, and more preferably 1% by mass or greater. On the other hand, if the amount of the alkyl (meth)acrylate copolymer is too large, then not only does the ink viscosity increase, but there is a possibility that the storage stability of the ink under conditions of high temperature may deteriorate, and therefore the amount is preferably not more than 20% by mass, and more preferably 15% by mass or less. An amount within a range from 2 to 15% by mass is particularly desirable.

The alkyl (meth)acrylate copolymer according to this embodiment is a copolymer of a monomer mixture comprising an alkyl (meth)acrylate (A) having an alkyl group of 12 or more carbon atoms (hereafter also referred to as the "monomer (A)"), and a reactive (meth)acrylate (B) having a functional group that is capable of reacting with an amino group (hereafter also referred to as the "monomer (B)") (hereafter this copolymer is also referred to as the "trunk polymer"), wherein pyridyl groups are introduced into the copolymer via a reaction between the functional group that is capable of reacting with an amino group and the aminopyridine compound.

Examples of the alkyl (meth)acrylate (A) having an alkyl group of 12 or more carbon atoms, and preferably 12 to 25 carbon atoms, include lauryl (meth)acrylate, cetyl (meth) acrylate, stearyl (meth)acrylate, behenyl (meth)acrylate, isolauryl (meth)acrylate and isostearyl (meth)acrylate. The alkyl (meth)acrylate (A) may include a plurality of these compounds.

Examples of preferred groups for the functional group within the reactive (meth)acrylate (B) that is capable of reacting with an amino group include a glycidyl group, vinyl group and (meth)acryloyl group. An example of the monomer (B) having a glycidyl group is glycidyl (meth)acrylate, and examples of the monomer (B) having a vinyl group include vinyl (meth)acrylate and 2-(2-vinyloxyethoxy)ethyl(meth) acrylate. Examples of the monomer (B) having a (meth)acryloyl group include dipropylene glycol di(meth)acrylate and 1,6-hexanediol di(meth)acrylate. The reactive (meth)acrylate (B) may include a plurality of these reactive compounds.

The monomer mixture may also include a monomer (C) other than the aforementioned monomers (A) and (B) that is capable of copolymerization with the monomers (A) and (B), provided inclusion of the monomer (C) does not impair the effects of the present invention.

Examples of this monomer (C) include styrene-based monomers such as styrene and α-methylstyrene, vinyl acetate, vinyl benzoate, vinyl ether-based monomers such as butyl vinyl ether, maleate esters, fumarate esters, acrylonitrile, methacrylonitrile and α-olefins. Further, alkyl (meth) acrylates in which the alkyl chain length is less than 12 carbon atoms may also be used, including 2-ethylhexyl (meth)acrylate, isooctyl (meth)acrylate and tert-octyl (meth)acrylate. These monomers may be used individually, or in combinations of two or more compounds.

The amount of the alkyl (meth)acrylate (A) in the above monomer mixture is preferably at least 30% by mass, more preferably within a range from 40 to 95% by mass, and still more preferably from 50 to 90% by mass.

The amount of the reactive (meth)acrylate (B) is preferably within a range from 1 to 30% by mass, and more preferably from 3 to 25% by mass.

The monomer (C) other than the monomers (A) and (B) is preferably included in an amount of not more than 60% by mass, and preferably 10 to 40% by mass.

For the monomer (C), the use of a monomer (C1) having a β-diketone group (—C(=O)—C—C(=O)—) or a β-keto ester group (—C(=O)—C—C(=O)OR, wherein R represents a hydrocarbon group) is particularly preferred. By including this monomer (C1), the viscosity of the ink can be reduced. Accordingly, when selecting the solvent for the ink, there are minimal limitations based on the viscosity of the solvent itself, meaning the selection range for the non-aqueous solvent can be broadened. Further, the permitted range for the increase in ink viscosity caused by the addition of fixing resins or additives, which may be added according to need, can be broadened, meaning the degree of freedom associated with the ink formulation can also be broadened.

Preferred examples of the β-diketone group of the monomer (C1) include an acetoacetyl group and a propionacetyl group, whereas preferred examples of the β-keto ester group include an acetoacetoxy group and a propionacetoxy group, although these are not exhaustive lists.

Preferred examples of the monomer (C1) include (meth) acrylates and (meth)acrylamides having a β-diketone group or β-keto ester group in the ester chain. More specific examples include acetoacetoxyalkyl(meth)acrylates such as acetoacetoxyethyl (meth)acrylate, hexadione(meth)acrylate, and acetoacetoxyalkyl (meth)acrylamides such as acetoacetoxyethyl (meth)acrylamide. These monomers may be used individually, or in combinations of two or more compounds.

When the monomer (C1) is added, from the viewpoints of the effects obtained by adding the monomer and the storage stability of the ink, the amount of the monomer (C1) is preferably within a range from 3 to 30% by mass, and more preferably from 5 to 20% by mass, of the monomer mixture.

Each of the monomers described above can be polymerized easily by conventional radical copolymerization. The reaction is preferably conducted as either a solution polymerization or a dispersion polymerization.

During this reaction, in order to ensure that the molecular weight of the copolymer following polymerization falls within the preferred range mentioned above, the use of a chain transfer agent during polymerization is effective. Examples of compounds that can be used as this chain transfer agent include thiols such as n-butyl mercaptan, lauryl mercaptan, stearyl mercaptan and cyclohexyl mercaptan.

Examples of polymerization initiators that may be used include conventional thermal polymerization initiators, including azo compounds such as AIBN (azobisisobutyronitrile), and peroxides such as t-butyl peroxybenzoate and t-butylperoxy-2-ethylhexanoate (Perbutyl O, manufactured by NOF Corporation). Alternatively, a photopolymerization initiator may be used in which irradiation with an active energy beam is used to generate radicals.

Petroleum-based solvents (such as aroma-free (AF) solvents) and the like can be used as the polymerization solvent used in a solution polymerization. This polymerization solvent is preferably one or more solvents selected from among those solvents (described below) that can be used, as is, for the non-aqueous solvent within the ink.

During the polymerization reaction, other typically employed polymerization inhibitors, polymerization accelerators and dispersants and the like may also be added to the reaction system.

Next, pyridyl groups are introduced into the obtained copolymer (the trunk polymer) by a reaction between the functional group that is capable of reacting with an amino group and the aminopyridine compound.

Specifically, the pyridyl groups can be introduced using a primary or secondary aminopyridine compound represented by general formula (1) shown below.

[Chemical Formula 2]

General formula (1)

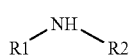

In general formula (1), at least one of R1 and R2 independently represents -Py or —R3-Py. Here, -Py represents a position 2, position 3 or position 4 pyridyl group. R3 represents an arbitrary divalent group, and may be a substituted or unsubstituted, linear, branched or cyclic hydrocarbon group. When only one of R1 and R2 contains a pyridyl group, the remaining group represents an arbitrary monovalent group, which may be a substituted or unsubstituted, linear, branched or cyclic hydrocarbon group, and examples of groups that can be used favorably include a hydrogen atom, benzyl group, methyl group, cyclohexyl group and isopropyl group.

Examples of the aminopyridine compound include 2-methylaminopyridine, 2-benzylaminopyridine, 2-aminopyridine and 4-aminopyridine. From the viewpoint of reactivity, a secondary aminopyridine compound is preferred. A plurality of these aminopyridine compounds may also be used in combination. Further, a combination of one or more of these aminopyridine compounds with one or more other amine compounds such as an amino alcohol may also be used.

From the viewpoint of ease of availability of the raw material, the aminopyridine compound is preferably a compound in which the amino group is bonded to position 2 of the pyridine group, and compounds such as 2-methylaminopyridine and 2-benzylaminopyridine can be used particularly favorably.

From the viewpoint of ensuring the introduction of a suitable amount of pyridyl groups into the copolymer, the aminopyridine compound is preferably reacted in an amount that is sufficient to provide 0.25 to 1 molar equivalents, and more preferably 0.25 to 0.75 molar equivalents, of the pyridyl group within the aminopyridine compound relative to the functional group that is capable of reacting with an amino group in the aforementioned monomer (B). When this amount of the pyridyl group within the aminopyridine compound is less than 1 molar equivalent, unreacted functional groups from the monomer (B) remain in the copolymer, but it is thought that these residual functional groups function as pigment adsorption groups.

This reaction can be performed by adding the aminopyridine compound to the solution of the aforementioned copolymer, and then heating the mixture while stirring under a stream of an inert gas.

The pigment incorporated within the ink according to the present embodiment may be any color. Examples of pigments that can be used for a black ink include carbon blacks such as furnace black, lamp black, acetylene black and channel black, metals or metal oxides such as copper, iron and titanium oxide, and organic pigments such as orthonitroaniline black. These pigments may be used either individually, or in mixtures of two or more different pigments.

Examples of pigments that can be used for color inks include toluidine red, permanent carmine FB, disazo orange PMP, lake red C, brilliant carmine 6B, quinacridone red, dioxane violet, orthonitroaniline orange, dinitroaniline orange, vulcan orange, chlorinated para red, brilliant fast scarlet, naphthol red 23, pyrazolone red, barium red 2B, calcium red 2B, strontium red 2B, manganese red 2B, barium lithol red, pigment scarlet 3B lake, lake bordeaux 10B, anthocyn 3B lake, anthocyn 5B lake, rhodamine 6G lake, eosine lake, iron oxide red, naphthol red FGR, rhodamine B lake, methyl violet lake, dioxazine violet, naphthol carmine FB, naphthol red M, fast yellow AAA, fast yellow 10G, disazo yellow AAMX, disazo yellow AAOT, disazo yellow AAOA, disazo yellow HR, isoindoline yellow, fast yellow G, disazo yellow AAA, phthalocyanine blue, Victoria pure blue, basic blue 5B lake, basic blue 6G lake, fast sky blue, alkali blue R toner, peacock blue lake, Prussian blue, ultramarine, reflex blue 2G, reflex blue R, alkali blue G toner, brilliant green lake, diamond green thioflavine lake, phthalocyanine green G, green gold, phthalocyanine green Y, iron oxide powder, rust powder, zinc white, titanium oxide, calcium carbonate, clay, barium sulfate, alumina white, aluminum powder, bronze powder, daylight fluorescent pigments, and pearl pigments. These pigments may be used either individually, or in arbitrary mixtures.

From the viewpoints of discharge stability and storage stability, the average particle size of the pigment is preferably not more than 300 nm, more preferably not more than 150 nm, and still more preferably 100 nm or less. Here, the average particle size of the pigment refers to the value measured using a dynamic light-scattering particle size distribution measurement apparatus LB-500 manufactured by Horiba, Ltd.

The amount of the pigment within the ink is typically within a range from 0.01 to 20% by mass, and from the viewpoints of print density and ink viscosity, is preferably within a range from 3 to 15% by mass.

The ink of the present embodiment may also include another pigment dispersant in combination with the alkyl (meth)acrylate copolymer described above. There are no particular limitations on this pigment dispersant, and any dispersant that enables the pigment to be dispersed stably within the solvent may be used. Examples include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, high-molecular weight copolymers, modified polyurethanes, modified polyacrylates, polyether ester anionic surfactants, naphthalenesulfonic acid-formalin condensate salts, polyoxyethylene alkyl phosphate esters, polyoxyethylene nonyl phenyl ethers, polyester polyamines, and stearyl amine acetate. Among these, the use of a high-molecular weight dispersant is preferred. These dispersants may be used individually, or in combinations of two or more compounds.

In the ink according to the present embodiment, the term "non-aqueous solvent" refers to non-polar organic solvents and polar organic solvents for which the 50% distillation point is at least 150° C. The "50% distillation point" is measured in accordance with JIS K0066 "Test Methods for Distillation of Chemical Products" and refers to the temperature at which 50% by mass of the solvent is evaporated.

For example, examples of preferred non-polar organic solvents include aliphatic hydrocarbon solvents, alicyclic hydrocarbon solvents and aromatic hydrocarbon solvents. Specific examples of preferred aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by JX Nippon Oil & Energy Corporation; and Isopar G, Isopar H, Isopar L, Isopar M, Exxsol D40, Exxsol D80, Exxsol D100, Exxsol D130 and Exxsol D140, all manufactured by Exxon Mobil Corporation. Specific examples of preferred aromatic hydrocarbon solvents include Nisseki Cleansol G (alkylbenzene) manufactured by JX Nippon Oil & Energy Corporation, and Solvesso 200 manufactured by Exxon Mobil Corporation.

Examples of solvents that can be used as the polar organic solvent include ester-based solvents, alcohol-based solvents, higher fatty acid-based solvents, ether-based solvents, and mixtures thereof. Examples of preferred polar organic solvents include one or more solvents selected from the group consisting of ester-based solvents that are esters of a higher fatty acid of 8 to 20 carbon atoms and an alcohol of 1 to 24 carbon atoms, higher alcohols of 8 to 24 carbon atoms, and higher fatty acids of 8 to 20 carbon atoms.

More specific examples of polar organic solvents that can be used favorably include ester-based solvents such as methyl laurate, isopropyl laurate, isopropyl myristate, isopropyl palmitate, isostearyl palmitate, isooctyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; alcohol-based solvents such as isomyristyl alcohol, isopalmityl alcohol, isostearyl alcohol, oleyl alcohol, hexyldecanol, octyldodecanol and decyltetradecanol; higher fatty acid-based solvents such as nonanoic acid, isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether and propylene glycol dibutyl ether.

These non-aqueous solvents may be used individually, or in mixtures of two or more different solvents.

The ink of the present embodiment preferably includes a higher alcohol as the non-aqueous solvent. This enables the ink repellency of the nozzle plate surface to be improved further. It is thought that because higher alcohols exhibit good affinity with the pigment derivative described below, precipitation of the pigment derivative within the ink can be inhibited, and the ink repellency can be favorably maintained. This action is particularly effective at low temperatures.

The higher alcohol preferably contains 8 to 24 carbon atoms, more preferably 10 to 22 carbon atoms, and still more preferably 12 to 20 carbon atoms. Examples of this type of higher alcohol include those solvents among the alcohol-based solvents described above that contain 8 to 24 carbon atoms. Isomyristyl alcohol (14 carbon atoms), isocetyl alcohol (16 carbon atoms) and isostearyl alcohol (18 carbon atoms) and the like can be used particularly favorably.

From the viewpoint of dischargeability, the amount of the higher alcohol of 8 to 24 carbon atoms, relative to the total mass of the ink, is preferably not more than 20% by mass, more preferably not more than 15% by mass, and still more preferably 10% by mass or less.

The ink of the present embodiment may further comprise a pigment derivative. Here, a "pigment derivative" describes a compound in which a substituent has been introduced into the pigment structure. In the ink, the pigment structure within the pigment derivative adsorbs to the surface of the pigment in the ink, and the substituent portion of the pigment derivative orients with the solvent in the ink, yielding an effect that provides better dispersion of the pigment within the ink.

By using a pigment derivative in combination with the aforementioned alkyl (meth)acrylate copolymer comprising a (meth)acrylate unit having a pyridyl group, in addition to the inherent properties of the pigment derivative, the ink repellency of the nozzle plate surface can also be improved.

If a conventional pigment dispersant is combined with a pigment derivative, then although the ink repellency of the nozzle plate surface improves, other properties may deteriorate. For example, in the case of a pigment dispersant composed of a nitrogen-containing graft copolymer having polyester side chains (graft PN), if a pigment derivative is used in combination with the dispersant with the aim of the improving the ink repellency of the nozzle plate surface, then bleeding may occur within the printed image, the image properties may deteriorate, and in particular, show-through becomes more likely. Further, in the case of a pigment dispersant composed of a copolymer of vinylpyrrolidone and an alkene (namely, an alkylated PVP), if a pigment derivative is used in combination with the dispersant with the aim of the improving the ink repellency of the nozzle plate surface, then the storage stability of the ink may further deteriorate.

However, in the case of the alkyl (meth)acrylate copolymer comprising an aforementioned (meth)acrylate unit having a pyridyl group, if a pigment derivative is used in combination with the copolymer with the aim of the improving the ink repellency of the nozzle plate surface, then the ink repellency of the nozzle plate surface can be improved without impairing any other properties.

Examples of materials that can be used favorably as the pigment derivative include compounds in which a functional group such as a carboxyl group, sulfonic acid group, amino group, carbonyl group or sulfonyl group has been added to the structure of a pigment such as a phthalocyanine-based, azo-based, anthraquinone-based or quinacridone-based pigment, as well as salts and the like of such compounds. These pigment derivatives may be used individually or in combination.

Examples of commercially available pigment derivatives that can be used favorably include Solsperse 5000 (a phthalocyanine derivative) manufactured by The Lubrizol Corporation and Byk-Synergist 2100 (a phthalocyanine derivative) manufactured by BYK-Chemie Japan Co., Ltd. These materials may be used individually or in combination.

The pigment derivative preferably has the same color as, or a similar color to, the pigment within the ink. For example, when the pigment derivative is added to a black ink or a cyan ink, a phthalocyanine pigment derivative can be used particularly favorably as the pigment derivative.

The amount of the pigment derivative, reported as a mass ratio relative to a value of 1 for the pigment, is preferably within a range from 0.015 to 0.150, more preferably from 0.020 to 0.100, and still more preferably from 0.030 to 0.080. Relative to the total mass of the ink, the amount of the pigment derivative is preferably within a range from 0.1 to 1.1% by mass, and more preferably from 0.25 to 0.60% by mass.

If the amount of the pigment derivative is too large, then the dispersibility of the pigment within the ink tends to deteriorate, and the stability of the ink within the printer may deteriorate. On the other hand, if the amount of the pigment derivative is too small, then maintaining the ink repellency of the nozzle plate surface in a satisfactory manner becomes difficult. Accordingly, the amount of the pigment derivative preferably satisfies the ranges described above.

The ink according to the present embodiment may also include other arbitrary components in amounts that do not impair the effects of the present invention. For example, resins that may be added besides the aforementioned alkyl (meth)acrylate copolymer include acrylic resins, styrene-acrylic resins, styrene-maleic acid resins, rosin-based resins, rosin ester-based resins, ethylene-vinyl acetate resins, petroleum resins, coumarone-indene resins, terpene phenol resins, phenolic resins, urethane resins, melamine resins, urea resins, epoxy resins, cellulose-based resins, vinyl chloride acetate resins, xylene resins, alkyd resins, aliphatic hydrocarbon resins, butyral resins, maleic acid resins, fumaric acid resins, hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, high-molecular weight copolymers, modified polyurethanes, modified polyacrylates, polyether ester anionic surfactants, naphthalenesulfonic acid-formalin condensate salts, aromatic sulfonic acid-formalin condensate salts, polyoxyethylene alkyl phosphate esters, polyoxyethylene nonyl phenyl ethers, polyester polyamines, and stearyl amine acetate.

Suitable amounts of nozzle blockage prevention agents, antioxidants, conductivity modifiers, viscosity modifiers, surface tension modifiers and oxygen absorbers and the like may also be added. There are no particular restrictions on the nature of these additives, and the types of materials typically used within this technical field may be used.

The ink according to the present embodiment can be obtained using any arbitrary production method. For example, the ink can be obtained by adding the alkyl (meth) acrylate copolymer, the pigment, the non-aqueous solvent and any other optional components, either in a single batch or in portions, to a dispersion device such as a beads mill, subsequently stirring and mixing the components, and if desired, filtering the resulting mixture through a membrane filter or the like.

The ideal range for the viscosity of the ink varies depending on factors such as the diameter of the discharge head nozzles in the inkjet recording system and the discharge environment, but at 23° C., is typically within a range from 5 to 30 mPa·s, and preferably from 5 to 15 mPa·s, and is still more preferably approximately 10 mPa·s. Here, the viscosity is measured at 23° C. by raising the shear stress from 0 Pa at a rate of 0.1 Pa/s, and refers to the measured value at 10 Pa.

Although there are no particular limitations on the printing method that uses the ink according to the present embodiment, conducting printing using an inkjet recording apparatus is preferred. The inkjet printer may employ any of various printing systems, including a piezo system, electrostatic system or thermal system. In those cases where an inkjet recording apparatus is used, the ink according to the present invention is preferably discharged from the inkjet head based on a digital signal, with the discharged ink droplets being adhered to a recording medium.

A pigment dispersant according to the embodiment of the present invention comprises an alkyl (meth)acrylate copolymer containing an alkyl (meth)acrylate unit having an alkyl group of 12 or more carbon atoms and a (meth)acrylate unit having a pyridyl group. By adding this pigment dispersant to a non-aqueous pigment ink, a printed item having superior image density and reduced show-through can be obtained, and favorable storage stability can also be achieved.

The present invention is able to provide a non-aqueous pigment ink and a pigment dispersant for a non-aqueous pigment ink that yield superior image density, reduced show-through and favorable storage stability.

EXAMPLES

A more detailed description of the present invention is provided below based on a series of examples, but the present invention is in no way limited by these examples. In the following description, the units "% by mass" are abbreviated as simply "%". Further, unless specified otherwise, the same components were used throughout the examples.

<Preparation of Alkyl (Meth)Acrylate Copolymers>

[Step 1]

A 300 ml four-neck flask was charged with 75 g of AF-4 (a naphthene-based solvent, manufactured by JX Nippon Oil & Energy Corporation), and the temperature was raised to 110° C. under a stream of nitrogen gas and with stirring. Next, with the temperature held at 110° C., a monomer mixture with the composition shown in Table 1 was added to the flask, and then a mixture containing 16.7 g of AF-4 and 2 g of Perbutyl O (t-butylperoxy-2-ethylhexanoate, manufactured by NOF Corporation) was added dropwise to the flask over a period of 3 hours. Subsequently, with the temperature maintained at 110° C., additional 0.2 g samples of Perbutyl O were added for an additional one hour and two hours respectively.

The mass average molecular weight (determined by a GPC method and referenced against standard polystyrenes) of the obtained trunk polymer m was 12,400.

TABLE 1

| Monomer composition | |
|---|---|
| Monomer | (g) |
| VMA: behenyl methacrylate | 70.0 |
| GMA: glycidyl methacrylate | 15.0 |
| AAEM: 2-acetoacetoxyethyl methacrylate | 15.0 |
| Total | 100.0 |

The components used in Table 1 are as listed below.

VMA: behenyl methacrylate, molecular weight 339, number of carbon atoms within the alkyl group: 22, manufactured by NOF Corporation.

GMA: glycidyl methacrylate, molecular weight 142, manufactured by Wako Pure Chemical Industries, Ltd.

AAEM: 2-acetoacetoxyethyl methacrylate, molecular weight 214, manufactured by Nippon Synthetic Chemistry Industry Co., Ltd.

[Step 2]

Following aging at 110° C. for one hour, the reaction mixture was diluted with 17.4 g of AF-4, yielding a trunk polymer mixture m having a non-volatile fraction of 50%.

[Step 3]

The formulations of resin mixtures are shown in Table 2. Following completion of step 2, 9.7 g of 2-benzylaminopyridine was added to the trunk polymer mixture m, and following aging at 110° C. for one hour, the mixture was diluted with AF-4, yielding a resin mixture a having a non-volatile fraction of 50%. In a similar manner, resin mixtures b to e having a non-volatile fraction of 50% were prepared with the resin mixture formulations shown in Table 2.

TABLE 2

| Resin mixture formulations | | | | | | |
|---|---|---|---|---|---|---|
| Component (g) (amount added) | | Resin mixture | | | | |
| | | a | b | c | d | e |
| Trunk polymer mixture m | | 100.0 | 100.0 | 100.0 | 100.0 | 100.0 |
| Amine compound | 2-benzylaminopyridine | 9.7 | — | 4.9 | — | — |
| | 2-methylaminopyridine | — | 8.6 | — | 5.7 | — |
| | diethanolamine | — | — | — | — | 5.5 |
| | AF-4 | 109.0 | 108.5 | 104.5 | 105.5 | 105.5 |
| Total | | 218.7 | 217.1 | 209.4 | 211.2 | 211.0 |
| Molar ratio (equivalents) of amine compound relative to glycidyl methacrylate | | 0.50 | 0.75 | 0.25 | 0.50 | 0.50 |

The components used in Table 2 are as listed below.

2-benzylaminopyridine: molecular weight 184.24, manufactured by Wako Pure Chemical Industries, Ltd.

2-methylaminopyridine: molecular weight 108.14, manufactured by Tokyo Chemical Industry Co., Ltd.

Diethanolamine: molecular weight 105.1, manufactured by Wako Pure Chemical Industries, Ltd.

<Preparation of Inks>

Table 3 shows the ink formulations for a series of examples, and Table 4 shows the ink formulations for comparative examples. The components were premixed in the amounts shown in Table 3 or Table 4 to produce a liquid preparation, 35 g of the thus obtained liquid preparation was placed in a glass container, 100 g of zirconia beads (φ0.5 mm) were added, and the mixture was dispersed for two hours using a rocking mill (RM05S manufactured by Seiwa Technical Lab Co., Ltd.) at a frequency of 65 Hz, thus preparing a non-aqueous pigment ink.

TABLE 3

Ink formulations and evaluations results for examples

| Mass % (solid fraction) | | Example 1 | 2 | 3 | 4 | 5 | 6 | 7 | 8 |
|---|---|---|---|---|---|---|---|---|---|
| Pigment | Carbon black | 10.00 | 10.00 | 10.00 | 10.00 | 10.00 | 10.00 | 10.00 | 10.00 |
| | Resin mixture a | 6.00 | — | — | — | 6.00 | — | — | — |
| | Resin mixture b | — | 6.00 | — | — | — | 6.00 | — | — |
| | Resin mixture c | — | — | 6.00 | — | — | — | 6.00 | — |
| | Resin mixture d | — | — | — | 6.00 | — | — | — | 6.00 |
| | Resin mixture e | — | — | — | — | — | — | — | — |
| | V-216 | — | — | — | — | — | — | — | — |
| | S28000 | — | — | — | — | — | — | — | — |
| Non-aqueous solvent | Isooctyl palmitate | 34.00 | 34.00 | 34.00 | 34.00 | 33.50 | 33.50 | 33.50 | 33.50 |
| | Isomyristyl alcohol | 10.00 | 10.00 | 10.00 | 10.00 | 10.00 | 10.00 | 10.00 | 10.00 |
| | AF-4 | 40.00 | 40.00 | 40.00 | 40.00 | 40.00 | 40.00 | 40.00 | 40.00 |
| Pigment derivative | S5000 | — | — | — | — | 0.50 | 0.50 | 0.50 | 0.50 |
| Total | | 100.00 | 100.00 | 100.00 | 100.00 | 100.00 | 100.00 | 100.00 | 100.00 |
| Amount of amine compound per 1 g of pigment (mmol) | | 0.29 | 0.44 | 0.15 | 0.30 | 0.29 | 0.44 | 0.15 | 0.30 |
| Evaluations | Image density | AA | AA | A | A | AA | AA | A | A |
| | Show-through | A | A | A | A | A | A | A | A |
| | Storage stability | A | A | A | A | A | A | A | A |
| | Nozzle plate ink repellency | B | B | B | B | AA | A | AA | A |
| | Fine text reproducibility | A | A | A | A | A | A | A | A |

TABLE 4

Ink formulations and evaluations results for comparative examples

| Mass % (solid fraction) | | Comparative example 1 | 2 | 3 | 4 |
|---|---|---|---|---|---|
| Pigment | Carbon black | 10.00 | 10.00 | 10.00 | 10.00 |
| | Resin mixture a | — | — | — | — |
| | Resin mixture b | — | — | — | — |
| | Resin mixture c | — | — | — | — |
| | Resin mixture d | — | — | — | — |
| | Resin mixture e | 6.00 | — | — | — |
| | V-216 | — | 6.00 | — | — |
| | S28000 | — | — | 6.00 | 6.00 |
| Non-aqueous solvent | Isooctyl palmitate | 34.00 | 34.00 | 28.00 | 27.50 |
| | Isomyristyl alcohol | 10.00 | 10.00 | 10.00 | 10.00 |
| | AF-4 | 40.00 | 40.00 | 46.00 | 36.00 |
| Pigment derivative | S5000 | — | — | — | 0.50 |
| Total | | 100.00 | 100.00 | 100.00 | 100.00 |
| Amount of amine compound per 1 g of pigment (mmol) | | 0.30 | — | — | — |
| Evaluations | Image density | C | A | C | C |
| | Show-through | C | A | B | C |
| | Storage stability | A | C | B | B |
| | Nozzle plate ink repellency | B | C | C | A |
| | Fine text reproducibility | B | A | B | B |

The components used in Table 3 and Table 4 are as listed below.
Carbon black: MA7, manufactured by Mitsubishi Chemical Corporation.
Resin mixture a: resin mixture of a pyridyl group-containing alkyl (meth)acrylate copolymer.
Resin mixture b: resin mixture of a pyridyl group-containing alkyl (meth)acrylate copolymer.
Resin mixture c: resin mixture of a pyridyl group-containing alkyl (meth)acrylate copolymer.
Resin mixture d: resin mixture of a pyridyl group-containing alkyl (meth)acrylate copolymer.
Resin mixture e: amine-modified alkyl (meth)acrylate copolymer
V-216: alkylated PVP, Antaron V-216 manufactured by ISP Japan Ltd. (a PVP-hexadecene copolymer, copolymerization ratio 2:8, mass average molecular weight 14 × 10$^3$)
S28000: Solsperse 28000, a graft PN manufactured by The Lubrizol Corporation.
Isooctyl palmitate: IOP, manufactured by Nikko Chemicals Co., Ltd.
Isomyristyl alcohol: FOC140N, a higher alcohol-based solvent manufactured by Nissan Chemical Industries, Ltd., carbon number: 14
S5000: Solsperse 5000, a phthalocyanine pigment derivative, manufactured by The Lubrizol Corporation <Evaluations>

Using each of the inks described above, evaluations were performed of the image density, show-through, storage stability, nozzle plate ink repellency, and printed item fine text reproducibility. The results are also shown in Table 3 and Table 4.

(Image Density and Show-Through)

Each of the inks described above was mounted in a line-type inkjet printer "Orphis-X9050" (manufactured by Riso Kagaku Corporation), and a printed item was produced by printing a solid black image at 300×300 dpi onto plain paper (Riso lightweight paper, manufactured by Riso Kagaku Corporation). The printed surface OD value and the rear surface OD value within the solid black image region of the printed item were measured using an optical densitometer (RD920, manufactured by Macbeth Corporation), and the image density and show-through were then evaluated against the criteria listed below. In the case of show-through, a lower rear surface OD value indicates a better evaluation. The Orphis X9050 is a system that uses a line-type inkjet head, wherein the paper is transported in a sub-scanning direction perpendicular to the main scanning direction (the direction along which the nozzles are aligned) while printing is conducted.

[Image Density]
AA: printed surface OD value of 1.15 or greater
A: printed surface OD value of at least 1.05 but less than 1.15
B: printed surface OD value of at least 0.95 but less than 1.05
C: printed surface OD value of less than 0.95

[Show-Through]
A: rear surface OD value of less than 0.26
B: rear surface OD value of at least 0.26 but less than 0.30
C: rear surface OD value of at least 0.30

(Storage Stability) (70° C., One Week)

Following measurement of the initial viscosity of each of the inks described above, each ink was placed in a sealed container and left to stand for one week in an environment at 70° C. The viscosity of the ink was then remeasured, and the change in the viscosity ((1−(viscosity after standing)/(initial viscosity))×100(%)) was determined and evaluated against the criteria listed below. The ink viscosity refers to the viscosity at 10 Pa when the shear stress was raised from 0 Pa at a rate of 0.1 Pa/s and at a temperature of 23° C., and was measured using a controlled stress rheometer RS75 manufactured by Haake GmbH (cone angle: 1°, diameter: 60 mm) The initial viscosity value for each of the inks was within the appropriate range for use as an inkjet ink.

A: change in viscosity of less than ±2%
B: change in viscosity of at least ±2% but not more than ±5%
C: change in viscosity exceeding ±5%

(Nozzle Plate Ink Repellency)

Each of the inks described above was mounted in an Orphis-X9050, and head cleaning was performed 5,000 times using the head maintenance "normal cleaning" function. The portion of the nozzle plate contacted by the wiping blade was then inspected visually for ink repellency, and the ink repellency was evaluated against the criteria listed below. In "normal cleaning", the ink path is pressurized to discharge ink from the head nozzles, and a rubber wiping blade is then used to wipe the ink off the nozzle surfaces.

AA: the ink repellency of the entire portion contacted by the wiping blade was maintained, and following head cleaning, the ink was completely repelled immediately.

A: the ink repellency of the entire portion contacted by the wiping blade was maintained, and following head cleaning, the ink was completely repelled within 20 seconds.

B: the ink repellency of part of the portion contacted by the wiping blade deteriorated.

C: the ink repellency of the entire portion contacted by the wiping blade deteriorated.

(Printed Item Fine Text Reproducibility)

Each of the inks described above was mounted in a line-type inkjet printer "Orphis-X9050", and 6 pt size text was printed onto a plain paper to obtain a printed item. One day after printing, the state of the text formation on the printed item was inspected visually, and printed items in which the fine text showed no blurring were evaluated as A, whereas printed items in which the fine text was blurred were evaluated as B.

As indicated in Table 3 and Table 4, the inks of the examples each exhibited favorable image density, show-through, storage stability and fine text reproducibility. Examples 1 and 2 had a high pyridyl group content, and exhibited particularly superior image density. The inks of examples 5 to 8 also comprised a pigment derivative, and exhibited particularly superior nozzle plate ink repellency.

Comparative example 1 comprised an amine-modified alkyl (meth)acrylate copolymer, and the image density, show-through and fine text reproducibility effects were not able to be obtained satisfactorily. Comparative example 2 comprised V-216, and the storage stability effect was unable to be obtained satisfactorily. Comparative example 3 comprised 528000, and the image density, show-through, fine text reproducibility and storage stability effects were not able to be obtained satisfactorily. Comparative example 4 comprised a combination of 528000 and a pigment derivative, and although the nozzle plate ink repellency improved, the show-through deteriorated.

<Comparison with Urethane-Modified Alkyl (Meth)Acrylate Copolymer>

A trunk polymer mixture m was obtained in the same manner as that described above in step 1 and step 2.

Next, a 500 mL four-neck flask was charged with 81 g of isooctyl palmitate, 200 g of the trunk polymer mixture m (solid fraction within AF-4 solvent: 50%), 4.0 g of propylene glycol and 2.8 g of diethanolamine, and the temperature was raised to 110° C. under a stream of nitrogen gas and with stirring. The temperature was held at 110° C. for one hour to enable the reaction between the glycidyl groups of the trunk polymer m and the diethanolamine to proceed to completion. Subsequently, 0.2 g of dibutyltin dilaurate was added, and a mixture containing 10.2 g of Takenate 600 (1,3-bis(isocyanatomethyl)cyclohexane, manufactured by Mitsui Chemicals, Inc.) and 91.8 g of IOP was then added dropwise to the flask over a period of one hour. Following completion of the dropwise addition, the temperature was raised to 120° C., the reaction was allowed to proceed for 6 hours, and the reaction mixture was then cooled, yielding a resin mixture f having a solid fraction of 30%.

The mass average molecular weight (determined by a GPC method and referenced against standard polystyrenes) of the obtained urethane-modified alkyl (meth)acrylate copolymer was 22,000.

TABLE 5

| Formulation of resin mixture f | | |
| --- | --- | --- |
| Component (g) | | Resin mixture f |
| Trunk polymer mixture m (solid fraction) | | 100.0 |
| Propylene glycol | | 4.0 |
| Diethanolamine | | 2.8 |
| Diisocyanate compound | | 10.2 |
| Solvent | AF-4 | 100.0 |
| | IOP | 172.8 |
| Mass ratio of trunk polymer m/polyurethane side chains | | 85/15 |

Table 6 shows the formulations for the ink of example 1 and the ink of comparative example 5 comprising the resin mixture f. The ink of comparative example 5 was prepared in the same manner as that described in example 1, with the exception of using the resin mixture f instead of the resin mixture a.

TABLE 6

| Ink formulations and evaluations results for example 1, comparative example 5 | | | | |
| --- | --- | --- | --- | --- |
| Mass % (solid fraction) | | | Example 1 | Comparative example 5 |
| Pigment | Carbon black | | 10.00 | 10.00 |
| | Resin mixture a | | 6.00 | — |
| | Resin mixture f | | — | 6.00 |
| Non-aqueous solvent | Isooctyl palmitate | | 34.00 | 34.00 |
| | Isomyristyl alcohol | | 10.00 | 10.00 |
| | AF-4 | | 40.00 | 40.00 |
| | Total | | 100.00 | 100.00 |
| Evaluation | Viscosity at 23° C. (mPa · s) | | 10.8 | 12.7 |

As is evident from Table 6, the ink of example 1 exhibited a lower viscosity than the ink of comparative example 5 which used a urethane-modified alkyl (meth)acrylate copolymer, and was suitable for use as an inkjet ink.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A non-aqueous pigment ink comprising:
a pigment;
a non-aqueous solvent; and
an alkyl (meth)acrylate copolymer comprising:
an alkyl (meth)acrylate unit having an alkyl group of 12 or more carbon atoms; and
a (meth)acrylate unit having a pyridyl group, wherein an amount of the pyridyl group included in the alkyl (meth)acrylate copolymer is 0.1 mmol to 0.6 mmol per 1 g of the pigment.

2. The non-aqueous pigment ink according to claim 1, further comprising a pigment derivative.

3. The non-aqueous pigment ink according to claim 1, wherein the non-aqueous pigment ink is used in an inkjet recording method.

4. The non-aqueous pigment ink according to claim 1, wherein the pigment is at least one selected from the group consisting of a carbon black, a metal oxide, toluidine red, permanent carmine FB, disazo orange PMP, lake red C, brilliant carmine 6B, quinacridone red, dioxane violet, orthonitroaniline orange, dinitroaniline orange, vulcan orange, chlorinated para red, brilliant fast scarlet, naphthol red 23, pyrazolone red, barium red 2B, calcium red 2B, strontium red 213, manganese red 2B, barium lithol red, pigment scarlet 3B lake, lake bordeaux 1013, anthocyn 313 lake, anthocyn 5B lake, rhodamine 6G lake, eosine lake, iron oxide red, naphthol red FGR, rhodamine B lake, methyl violet lake, dioxazine violet, naphthol carmine FB, naphthol red M, fast yellow AAA, fast yellow 10G, disazo yellow AAMX, disazo yellow AAOT, disazo yellow AAOA, disazo yellow HR, isoindoline yellow, fast yellow G, disazo yellow AAA, phthalocyanine blue, Victoria pure blue, basic blue 5B lake, basic blue 6G lake, fast sky blue, alkali blue R toner, peacock blue lake, Prussian blue, ultramarine, reflex blue 2G, reflex blue R, alkali blue G toner, brilliant green lake, diamond green thioflavine lake, phthalocyanine green G, green gold, phthalocyanine green Y, iron oxide powder, rust powder, zinc white, titanium oxide, calcium carbonate, clay, barium sulfate, alumina white, aluminum powder, bronze powder, daylight fluorescent pigments, and pearl pigments.

5. The non-aqueous pigment ink according to claim 1, wherein the non-aqueous solvent is at least one selected from the group consisting of an aliphatic hydrocarbon solvent, an alicyclic hydrocarbon solvent, an aromatic hydrocarbon solvent, an ester-based solvent, an alcohol-based solvent, a fatty acid-based solvent, and an ether-based solvent.

6. The non-aqueous pigment ink according to claim 1, wherein the alkyl group of 12 or more carbon atoms is at least one selected from the group consisting of a dodecyl group, a tridecyl group, a tetradecyl group, a pentadecyl group, a hexadecyl group, a heptadecyl group, am octadecyl group, a nonadecyl group, an eicosanyl group, a heneicosanyl group, a docosanyl group, an isododecyl group and an isooctadecyl group.

7. The non-aqueous pigment ink according to claim 1, wherein the pyridyl group is bonded to the alkyl (meth)acrylate unit having the pyridyl group as a portion of an amino group.

8. The non-aqueous pigment ink according to claim 1, wherein a viscosity of the non-aqueous pigment ink is in a range from 5 to 30 mPa·s, where the viscosity is measured at 23° C. by raising a shear stress from 0 Pa at a rate of 0.1 Pa/s.

9. The non-aqueous pigment ink according to claim 1, wherein the alkyl (meth)acrylate copolymer is a copolymer of a monomer mixture comprising an alkyl (meth)acrylate (A) having an alkyl group of 12 or more carbon atoms, and a reactive (meth)acrylate (B) having a functional group that is capable of reacting with an amino group, wherein pyridyl groups are introduced into the copolymer via a reaction between the functional group that is capable of reacting with an amino group and an aminopyridine compound.

10. The non-aqueous pigment ink according to claim 9, wherein the aminopyridine compound is 2-benzylaminopyridine or 2-methylaminopyridine.

11. The non-aqueous pigment ink according to claim 9, wherein the aminopyridine compound is reacted in an amount that is sufficient to provide 0.25 molar equivalents to 1.00 molar equivalents of pyridyl groups within the aminopyridine compound relative to the functional group that is capable of reacting with an amino group in the reactive (meth)acrylate (B).

12. The non-aqueous pigment ink according to claim 1, wherein the alkyl (meth)acrylate copolymer is a copolymer obtained by a monomer mixture comprising the alkyl (meth)acrylate unit (A) having an alkyl group of 12 or more carbon atoms and a reactive (meth)acrylate (B) having a functional group that is capable of reacting with an amino group, wherein the pyridyl group is introduced into the alkyl (meth) acrylate copolymer via a reaction between the functional group that is capable of reacting with an amino group and an aminopyridine compound, and wherein the aminopyridine compound is reacted in an amount that is sufficient to provide 0.25 molar equivalents to 1.00 molar equivalents of pyridyl groups within the aminopyridine compound relative to the functional group that is capable of reacting with an amino group in the reactive (meth)acrylate (B).

13. The non-aqueous pigment ink according to claim 12, wherein the aminopyridine compound is represented by the following formula (1):

(I)

wherein R1 and R2 independently represent -Py, —R3-Py, a substituted or unsubstituted, linear, branched or cyclic hydrocarbon group, a hydrogen atom, a benzyl group, a methyl group, a cyclohexyl group or an isopropyl group, where -Py represents a position 2, 4 position 3 or position 4 pyridyl group and R3 represents a divalent group that is a substituted or unsubstituted, linear, branched or cyclic hydrocarbon group.

14. The non-aqueous pigment ink according to claim 12, wherein the pyridyl group is bonded to the reactive (meth)acrylate (B) as a portion of an amino group.

15. The non-aqueous pigment ink according to claim 12, wherein an amount of the alkyl (meth)acrylate (A) unit in the monomer mixture is at least 30% by mass based on the monomer mixture, and an amount of the reactive (meth)acrylate (B) in the monomer mixture is in a range from 1 to 30% by mass based on the monomer mixture.

* * * * *